US012157205B2

(12) United States Patent
Li et al.

(10) Patent No.: US 12,157,205 B2
(45) Date of Patent: Dec. 3, 2024

(54) FLAMED-BASED VACUUM GENERATOR

(71) Applicant: Zhejiang University, Zhejiang (CN)

(72) Inventors: Xin Li, Zhejiang (CN); Xufeng Shen, Zhejiang (CN); Ting Han, Zhejiang (CN); Yingjie He, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 362 days.

(21) Appl. No.: 17/643,338

(22) Filed: Dec. 8, 2021

(65) Prior Publication Data

US 2022/0176520 A1 Jun. 9, 2022

(30) Foreign Application Priority Data

Dec. 8, 2020 (CN) ......................... 202011445446.7

(51) Int. Cl.
*B25B 11/00* (2006.01)
*F23K 5/14* (2006.01)
*F23L 1/00* (2006.01)

(52) U.S. Cl.
CPC .............. *B25B 11/005* (2013.01); *F23K 5/14* (2013.01); *F23L 1/00* (2013.01)

(58) Field of Classification Search
CPC ....... B25B 11/005; B25B 11/007; F23K 5/14; F23L 1/00
USPC ................ 431/356, 300, 333; 291/21; 279/3
See application file for complete search history.

(56) References Cited

U.S. PATENT DOCUMENTS 4,561,840 A * 12/1985 Nakamura .............. F23N 5/242 431/78
5,921,765 A * 7/1999 Smith ....................... F23R 7/00 431/1

OTHER PUBLICATIONS

T. Han and X. Li, "Development of Vacuum Suction Unit Using Flame Extinguishment," 2018 IEEE/ASME International Conference on Advanced Intelligent Mechatronics (AIM), Auckland, New Zealand, 2018, pp. 432-437, doi: 10.1109/AIM.2018.8452706 (Year: 2018).*

* cited by examiner

*Primary Examiner* — Vivek K Shirsat
(74) *Attorney, Agent, or Firm* — McCoy Russell LLP

(57) ABSTRACT

The present disclosure discloses a flamed-based vacuum generator, including a shell and a combustion assembly, where the shell has a cavity, the cavity being a space having at least one opening, and the combustion assembly includes a combustible object and an igniter, the igniter being configured to ignite the combustible object, the combustible object generating a flame in the cavity, and the flame extinguishing in the cavity. In the present disclosure, through in-depth study of the internal mechanism of vacuum generated by flame combustion, it is found that the extinguishing process of a flame is the key to the generation of vacuum, and a larger flame and more sufficient combustion indicate a higher vacuum pressure generated in the cavity after the flame is extinguished.

5 Claims, 4 Drawing Sheets

FLAMED-BASED VACUUM GENERATOR

CROSS REFERENCE TO RELATED APPLICATION

The present application claims priority to Chinese Patent Application No. 202011445446.7 filed on Dec. 8, 2020. The entire contents of the above-listed application is hereby incorporated by reference for all purposes.

TECHNICAL FIELD

The present disclosure relates to the vacuum technical field, and relates to a flamed-based vacuum generator.

BACKGROUND

Vacuum is widely used in all walks of life. Usually, the machines that produce vacuum include a vacuum pump and a jet vacuum tube. The vacuum pump drives a motor by consuming electricity, the motor drives blades or screws and other structures to produce vacuum. The jet vacuum tube generates vacuum by using the entrainment effect of a high-pressure fluid at a high speed. Such the vacuum generating machines have the following disadvantages:

(1) Huge power consumption: In the process of generating vacuum, energy is converted and transmitted many times. By using a vacuum pump as an example, first, power plants burn coal to generate electricity, and petrochemical energy is converted into electric energy. Electricity is transmitted through the power grid. The electricity is transmitted to the vacuum pump, and the electrical energy is converted into mechanical kinetic energy. The mechanical kinetic energy drives blades or screws and other structures to move, to generate vacuum, and the mechanical kinetic energy is converted into fluid potential energy (vacuum pressure is a form of fluid potential energy). Three times of energy form conversion and long-distance energy transmission occur in the whole process, and therefore a huge energy loss is caused. Further by using the jet vacuum tube as an example, the jet vacuum tube needs to be driven by high-pressure air, and therefore the jet vacuum tube needs one more energy conversion than the vacuum pump (the mechanical kinetic energy of the fluid compressor is converted into fluid kinetic energy of a high-speed fluid, and the fluid kinetic energy is converted into fluid potential energy).

(2) Limited use occasions: Both the vacuum pump and the jet vacuum tube require high power supply, so they can only be used under the condition of power supply.

(3) Loud noise: The motion of the motor and structure of the vacuum pump continuously produces huge noise. Rotation of the motor and the structure may drive the whole vacuum pump to vibrate, which produces noise. Therefore, a vibrating vacuum pump is a vibrating noise source, which continuously emits huge noise outward. A high-speed jet flow of the jet vacuum tube may produce a large number of airflow vortexes, which may produce huge aerodynamic noise, and the noise may be transmitted to the outside with the exhaust flow of jet vacuum tube, resulting in huge noise.

According to life experience and common sense, we know that burning with a flame can also form vacuum, such as cupping. However, for the cupping, a flame is used to preheat a cavity of a cupping pot, and is then taken out, and then the cavity is putted upside down on a human body. As the temperature in the cavity of the cupping pot gradually decreases, the air inside shrinks and forms a vacuum. However, such the vacuum generation method has two disadvantages: (1) Because the air cooling speed is relatively slow (several seconds or even several minutes), the vacuum formation process takes a long time; (2) It is impossible to produce high vacuum when the temperature decreases, so the adsorption force of the vacuum is insufficient and there is no engineering application value.

SUMMARY

With regard to the defects in the prior art, the present disclosure provides a flamed-based vacuum generator, which generates vacuum by generating a flame and extinguishing the flame in a cavity, and improves the structure by studying the internal mechanism of vacuum formation, thus further effectively improving the vacuum pressure and being beneficial to engineering application.

The technical solution adopted in the present disclosure is as follows:

A flamed-based vacuum generator includes a shell and a combustion assembly, where the shell has a cavity, the cavity being a space having at least one opening, and the combustion assembly includes a combustible object and an igniter, the igniter being configured to ignite the combustible object, the combustible object generating a flame in the cavity, and the flame extinguishing in the cavity.

In the above-mentioned technical solution, further, the combustion assembly further includes a fuel replenishment unit, where the fuel replenishment unit is configured to replenish fuel required by the combustible object to the cavity. Through the replenishment of fuel, the process of combustion and extinguishment of a flame can be carried out continuously in the cavity to improve the vacuum.

Further, the fuel replenished to the cavity by the fuel replenishment unit is a combustible gas, a combustible liquid, or an atomized combustible liquid. The use of a gaseous or atomized fuel is conducive to filling the flame in the cavity, that is, enabling the combustion to be more sufficient and the flame to be larger, so as to improve the vacuum.

Further, the vacuum generator further includes a ventilation mechanism, and the ventilation mechanism is configured to deliver air or a combustion-supporting gas to the cavity. In the combustion process, the oxygen in the cavity is continuously consumed, which is not conducive to the further improvement of vacuum. By replenishing air or combustion-supporting gas by using the ventilation mechanism, the combustion process is enabled to be sustainable or more sufficient.

Further, the ventilation mechanism further includes a blowing device and an intercepting mechanism, the intercepting mechanism is configured to control communication between the cavity and outside atmosphere, so that the blowing device inputs the air or the combustion-supporting gas to the cavity.

Further, the vacuum generator further includes a high pressure inhibition device, configured to reduce a high pressure formed in the cavity when the flame is generated. When the cavity is in a closed state, the process of burning fuel inside the cavity to generate a flame may significantly increase the pressure in the cavity, which may be extremely unfavorable to the subsequent formation and improvement of vacuum in the cavity after the flame is extinguished. By designing a high pressure inhibition device, this problem can be effectively solved and the vacuum can be improved.

Further, the high pressure inhibition device communicates the cavity and the outside atmosphere only when the pressure in the cavity is greater than a pressure outside the shell.

By deeply studying the internal mechanism of vacuum generated by flame combustion, it has been found in the present disclosure that the core factor is that a flame is a gaseous substance, and the extinguishing process of the flame is that the gaseous substance condenses into a liquid or solid, thus generating vacuum. A larger flame indicates a higher vacuum pressure that is generated after the flame is extinguished. In addition, it is found that generation of a flame in a closed cavity may form a high pressure in the cavity, which may greatly affect the vacuum formed after the flame is extinguished. Based on this, the present disclosure provides a flamed-based vacuum generator, and carries out various improvements and optimizations on the basis of the vacuum generator. Compared with the existing vacuum generating device (a vacuum pump, a jet vacuum tube, or the like), the vacuum generator of the present disclosure has the following advantages.

(1) Extremely low energy consumption: The present disclosure directly uses fuel as a power source. Combustion of fuel directly produces fluid potential energy (that is, vacuum pressure). There is only one energy conversion in the whole process, which minimizes the energy loss.

(2) Wide range of use: The present disclosure does not need high-power electrical equipment, so it does not need high-power electrical supply. The flamed-based vacuum generator can operate under the condition of extremely low power supply (the power of ignition spark generated by the igniter is extremely low, and the ignition can be realized by using a very small button cell).

(3) Low noise: When igniting, the electric spark of the igniter may make an extremely weak sound. In an unsealed cavity, the generation of the flame produces almost no sound. In a closed cavity, the generation of the flame may produce an instant sound, but because the cavity is in a closed state, the sound cannot be effectively transmitted to the outside, and therefore the sound is not obvious. Further, extinguishment of the flame hardly makes a sound. In summary, the present disclosure does not generate continuous mechanical vibration and high-speed airflow, and therefore does not generate significant noise.

DETAILED DESCRIPTION

The solutions of the present disclosure is further explained and described by combining the embodiments and the accompanying drawings.

Embodiment 1

In this example, the vacuum generator is formed by a shell, a combustible object, and an igniter. The combustible object is an alcohol-containing block. A cavity is formed in the shell, and the alcohol-containing block is disposed in the cavity. The cavity is provided with an opening. To test the pressure and temperature changes in the cavity, a temperature sensor and a pressure sensor are disposed on a surface of a workpiece.

Figure 1:
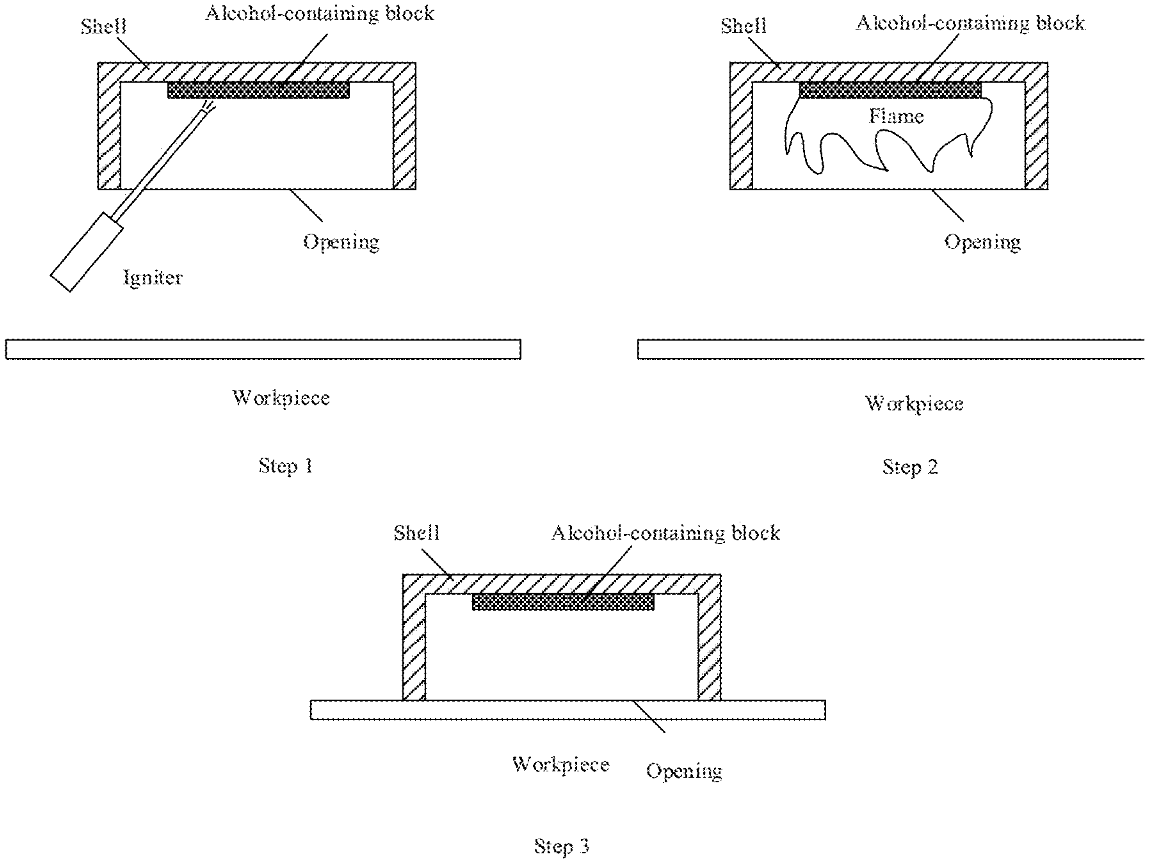
FIG. 1 is a schematic diagram of a most basic structure and process of the present disclosure.

As shown in FIG. 1, first, the igniter ignites a solid alcohol-containing block, and the solid alcohol-containing block burns in the cavity to form a flame. Then, an end face at the opening of the shell is placed on the workpiece, and the workpiece covers the opening of the cavity and separates the cavity from the surrounding atmosphere, so that the cavity forms a closed space. The flame consumes oxygen in the cavity, and with the gradual decrease in the oxygen concentration, the flame is extinguished, and a vacuum pressure is formed in the cavity. The opening of the shell connects the vacuum pressure to the surface of the workpiece and plays a role in sucking the workpiece.

Figure 2:
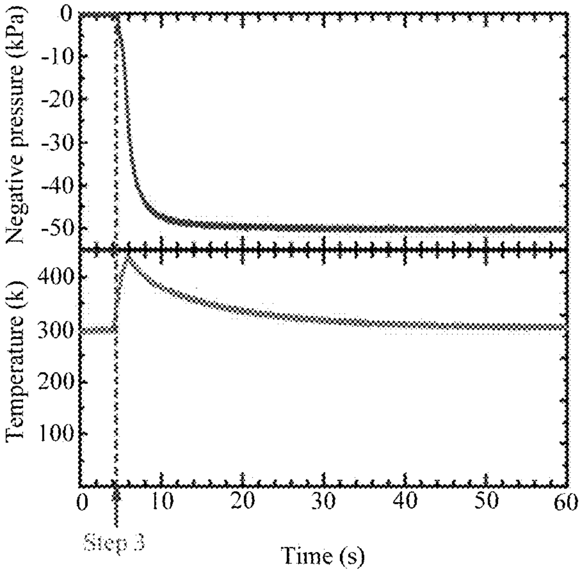
FIG. 2 is a change curve of pressure and temperature in a cavity during a whole process of combustion and extinguishment of a flame.

FIG. 2 is a curve of pressure and temperature in the cavity after the open end surface of the opening of the shell is placed on the workpiece. It can be seen that before step 3 in FIG. 1, the cavity is communicated with the surrounding atmosphere, and the pressure in the cavity is equal to the atmospheric pressure. After step 3, the pressure in the cavity decreases with the extinguishment of the flame, and finally a vacuum pressure of 50 kPa is formed. The reasons for the above vacuum pressure in the cavity are analyzed as follows:

1) The combustion of the solid alcohol-containing block consumes oxygen

Oxygen accounts for 20% of the air. In the process of alcohol combustion, assuming that the combustion is completely sufficient, the chemical reaction of alcohol combustion consumes three oxygen molecules and produces two carbon dioxide molecules at the same time. According to this calculation, after the flame is extinguished, the gas in the cavity is reduced by about 7% (=20%/3), and the vacuum pressure obtained through calculation is only 7 kPa. The vacuum pressure is far less than the vacuum pressure measured by experiments. Apparently, the reason is not the main reason for the vacuum in the above-mentioned cavity.

2) After the flame is extinguished, the temperature decreases and the gas cools and shrinks When the solid alcohol-containing block burns, a large amount of heat is released, which increases the temperature in the cavity. After the flame is extinguished, the combustion stops, the alcohol-containing block no longer releases heat, the heat in the cavity is dissipated through heat exchange with the shell wall, and the temperature in the cavity decreases, so the gas in the cavity cools and shrinks to form a vacuum pressure. However, the data in FIG. 2 shows that the temperature has been rising until the flame is completely extinguished. And, even though the temperature is still rising, the vacuum pressure has been formed in a short time. When the temperature rises to the peak, there is already a vacuum pressure of 30 kPa. Apparently, the vacuum pressure of 30 kPa cannot be explained by temperature drop. Moreover, the temperature drop is a very slow process, and therefore the temperature drop cannot well explain the rapid generation of vacuum pressure either.

3) Condensation of flame

Figure 3A:
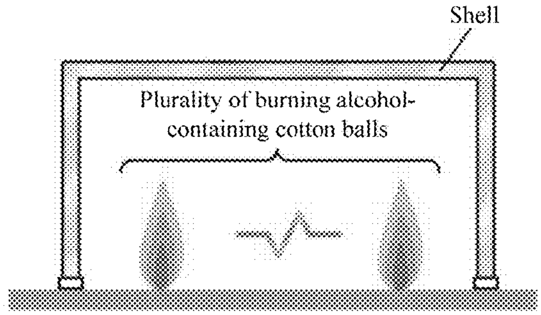
FIGS. 3A-3B show an experiment FIG. 3A and a result diagram FIG. 3B of a relationship between an amount of a flame and a vacuum pressure in the cavity.
Figure 3B:
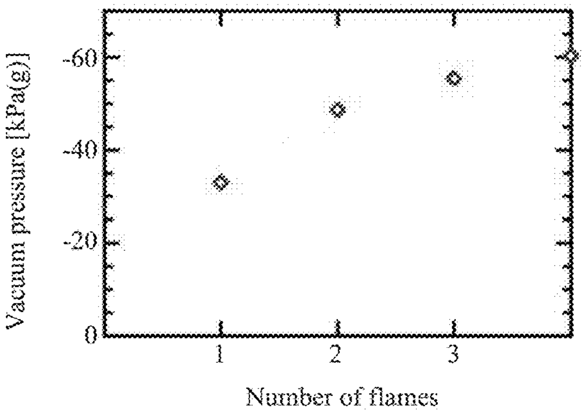

A flame is a gas-like substance. The extinguishment of a flame is essentially a process in which this gas-like substance condenses into a liquid or solid. That is, when the flame is extinguished, the gas-like flame disappears, thus generating vacuum. A larger flame volume indicates a higher vacuum pressure that is generated after the flame is extinguished. FIG. 3A is a schematic diagram of the corresponding experiment. A plurality of alcohol-containing cotton balls are placed on a plane. The plurality of alcohol-containing cotton balls are ignited to generate a plurality of flame clusters. Then, the flame clusters are covered by a shell, and meanwhile the pressure inside the shell is measured by using a pressure sensor, to obtain the experimental results in FIG. 3B. The experimental results show that a larger number of flame clusters indicates a greater vacuum pressure in the shell, that is, a larger flame volume indicates a greater vacuum pressure. Moreover, in the process, the generation of the vacuum pressure is synchronized with the extinguishment of the flame, so the generation speed of vacuum pressure is very quick.

Generally, people only know the above-mentioned 1) and 2), which leads to a misunderstanding that: after the flame is extinguished, the formation of vacuum is very slow (the temperature drop process takes a long time), and the vacuum pressure is very small. The misunderstanding limits the development and utilization of the phenomenon. In addition, it also leads to another misunderstanding that: the magnitude of vacuum is not correlated with the size of flame. Therefore, in the current cupping technology, a flame is not put inside the cavity, and no design requirements for the size of the flame are put forward. It has been found through research in the present disclosure that the third reason is the core reason of generating vacuum pressure, and when being applied to a vacuum generator, so long as sufficient combustion is ensured and a flame large enough is obtained, high vacuum pressure can be quickly generated. Such the vacuum generator can have the value of industrial applicability.

Embodiment 2

Figure 4:
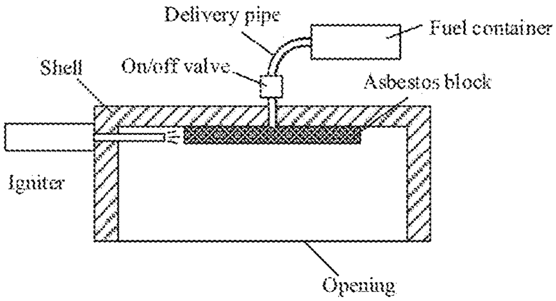
FIG. 4 is schematic structural diagram of a specific implementation of the present disclosure.

FIG. 4 shows another specific implementation of the present disclosure. Compared with Embodiment 1, the vacuum generator of this embodiment maintains sufficient combustion and obtains a large flame by replenishing fuel. There are many ways to replenish fuel, but this embodiment will only be explained in one specific way. In this embodiment, the combustible object is an alcohol-impregnated asbestos block disposed in a cavity of a shell. The vacuum generator further includes a fuel replenishment unit, which includes a fuel container disposed outside the shell. The fuel container and the asbestos block are connected through a delivery pipe. An on/off valve is mounted on the delivery pipe. The igniter is disposed outside the shell, and an ignition head of the igniter extends into the shell and is close to the asbestos block.

When the on/off valve is opened, the liquid fuel (such as alcohol, kerosene, or gasoline) stored in the fuel container flows to the asbestos block through the delivery pipe and soaks the asbestos block, and then the on/off valve is closed to cut off the liquid fuel supply. Then, the igniter ignites the liquid fuel on the asbestos block, to generate a flame. The end surface at the opening of the shell is placed on a workpiece. The workpiece covers the opening of the cavity and separates the cavity from the surrounding atmosphere. The flame is extinguished, and a vacuum pressure is formed inside the cavity. The opening of the shell connects the vacuum pressure to the surface of the workpiece and plays a role in sucking the workpiece. After repeated combustion, the liquid fuel on the asbestos block becomes less, which may lead to the flame becoming smaller. The on/off valve may be opened again to replenish fuel to the asbestos block to ensure that there is enough fuel on the asbestos block, so that it can burn to form a large flame, thereby obtaining a higher vacuum pressure after the flame is extinguished.

Embodiment 3

Figure 5:
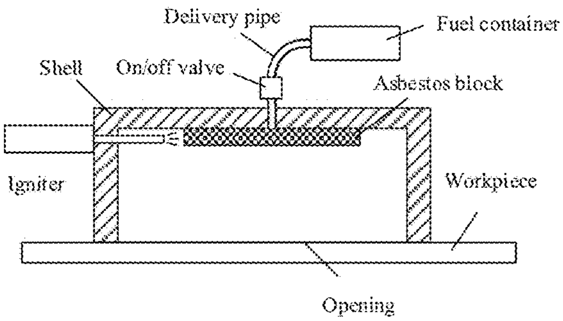
FIG. 5 is a schematic diagram of the structure shown in FIG. 4.
Figure 6:
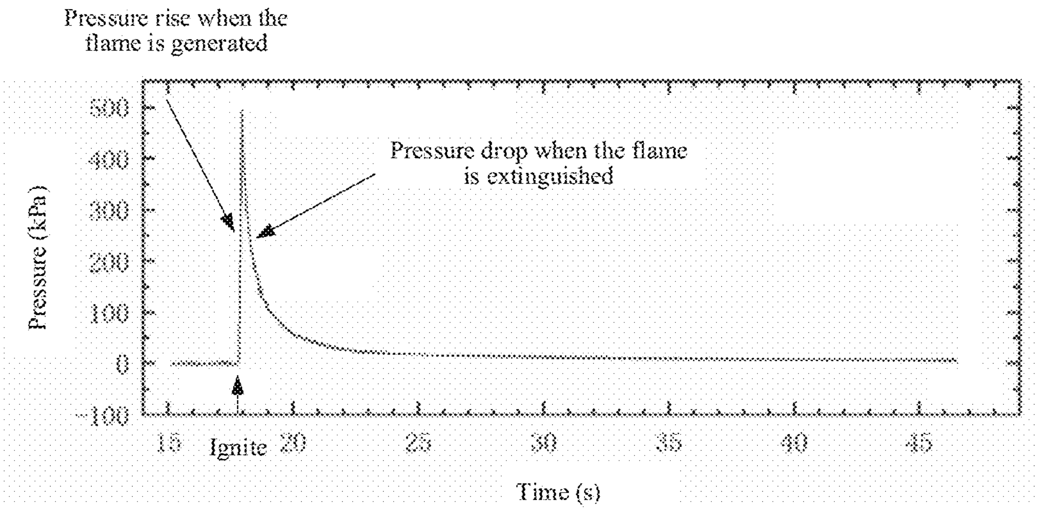
FIG. 6 is a change curve of pressure in the cavity during the experiment process in FIG. 5.

In this embodiment, the vacuum generator of FIG. 4 is placed on the workpiece in advance, and the shell and the workpiece form a closed cavity, as shown in FIG. 5. Then, the fuel on the asbestos block is ignited. The fuel burns with the air in the cavity to generate a flame. Subsequently, the air in the cavity ran out and the flame is extinguished. FIG. 6 is a change curve of pressure in the cavity obtained through experiments. When the fuel burns in the closed cavity, generation of the flame may cause the pressure in the cavity to rise rapidly. Such the pressure rise may raise the pressure drop curve when the flame is extinguished, which may lead to the decrease of vacuum pressure in the cavity, and even fail to form a vacuum pressure. Therefore, in industrial applications, inhibition of the pressure rise of the combustible object in closed cavity is helpful to enhance the vacuum pressure. In this embodiment, a high pressure inhibition device is disposed to inhibit and reduce the pressure rise when the flame is generated, thereby achieving the objective of improving the vacuum pressure. The high pressure inhibition device communicates the cavity with the outside atmosphere only when the pressure in the cavity is greater than a pressure outside the shell.

Figure 7:
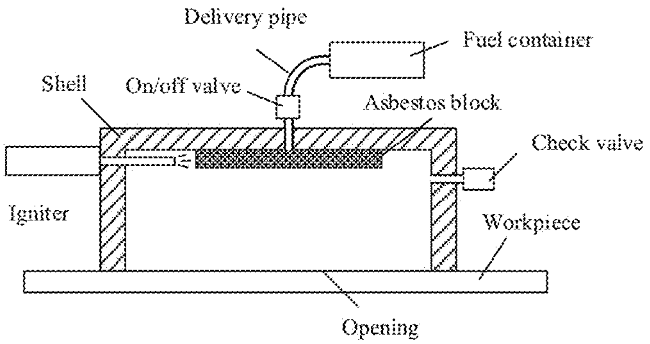
FIG. 7 is schematic structural diagram of another specific implementation of the present disclosure.
Figure 8:
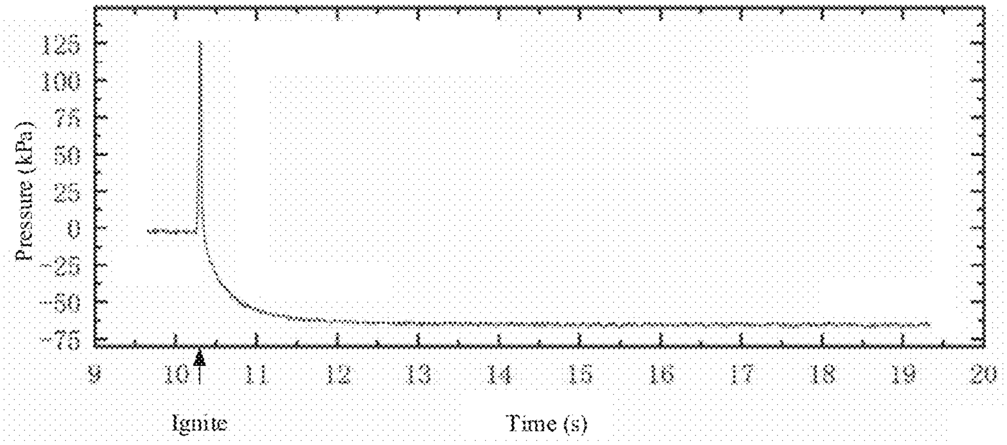
FIG. 8 is a change curve of pressure in a cavity during the experiment process of the structure in FIG. 7.

The high pressure inhibition device in this embodiment is a check valve, and the check valve is communicated with the cavity through a pipe, as shown in FIG. 7. When the fuel burns, the pressure in the cavity rises, and the check valve opens under the action of pressure difference between the two sides (the atmospheric pressure is lower than the pressure in the cavity). The high-pressure gas in the cavity is discharged through the check valve, thereby playing a role in reducing the high pressure in the cavity. When the vacuum pressure begins to form in the cavity, the check valve is closed under the action of pressure difference on both sides (the atmospheric pressure is higher than the pressure in the cavity), thereby playing a role in maintaining the vacuum pressure in the cavity. FIG. 8 shows experimental results of the device of FIG. 7. By comparing the results in FIG. 6 and FIG. 8, it can be seen that the high pressure inhibition device can effectively inhibit and reduce the pressure rise in the cavity and increase the vacuum pressure after the flame is extinguished.

Embodiment 4

Figure 9:
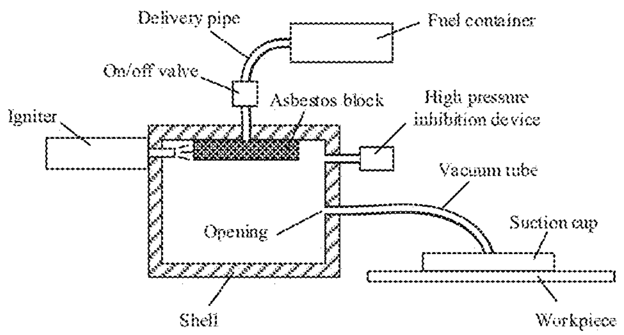
FIG. 9 is schematic structural diagram of another specific implementation of the present disclosure.

FIG. 9 shows another specific implementation of the present disclosure. This embodiment is a further improvement on the above-mentioned embodiments, and it is possible to conveniently use the vacuum pressure through the opening of the shell.

The opening of the shell in this embodiment is reduced into a hole. The opening of the shell communicates the vacuum pressure in the cavity through a vacuum tube to vacuum-using equipment, such as a suction cup. The vacuum in the cavity enables the suction cup to suck the workpiece. When the suction cup is detached from the workpiece, external air may flow through the suction cup and vacuum tube into the cavity, so that there is a certain amount of oxygen in the cavity, so that secondary combustion can be carried out.

Figure 10:
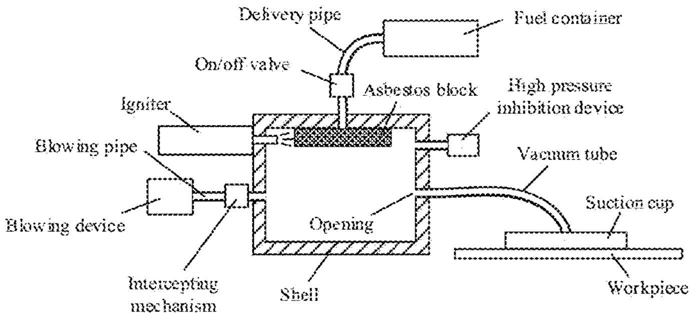
FIG. 10 is schematic structural diagram of another specific implementation of the present disclosure.

After primary combustion is completed, an exhaust gas may be generated in the cavity. The opening of the shell in this embodiment is relatively small, and therefore it is difficult to effectively discharge exhaust gas. If the exhaust gas cannot be discharged, the oxygen content in the cavity may be reduced, resulting in insufficient combustion of fuel, and further affecting the flame volume. Therefore, the vacuum generator of this embodiment is further provided with a ventilation mechanism for discharging combustion exhaust gas and feeding air, as shown in FIG. 10. The ventilation mechanism includes a blowing device and an intercepting mechanism. The intercepting mechanism is configured to control communication between the cavity and outside atmosphere, so that the blowing device inputs the air to the cavity or discharges the exhaust gas from the cavity to the outside atmosphere. Before the next combustion, the intercepting mechanism is opened to communicate the cavity with the outside atmosphere. The blowing device is then started, to feed outside air through the air supply pipe to the cavity. In the process of air supply, the exhaust gas from the last combustion is discharged outward through an open hole or an intercepting mechanism. After the exhaust gas is discharged and the air is filled in the cavity, the intercepting mechanism closes the communication between the cavity and the outside atmosphere, and at the same time, the blowing device stops. After the suction cup is placed on the workpiece, the igniter ignites the fuel on the asbestos block to carry out a new round of workpiece suction action.

In addition, to increase the burning flame, the ventilation mechanism may further feed a combustion-supporting gas such as pure oxygen to the cavity. Oxygen can make the combustion more sufficient and the flame bigger.

Embodiment 5

Figure 11:
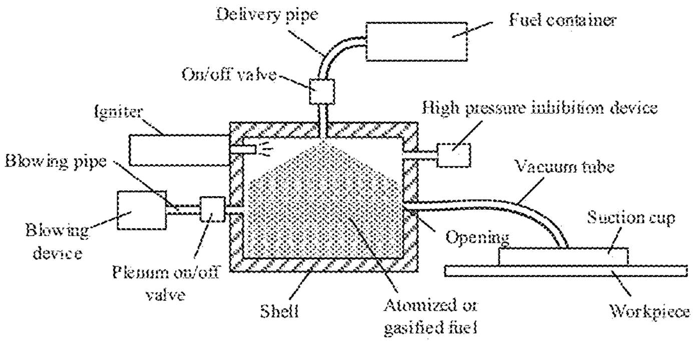
FIG. 11 is schematic structural diagram of another specific implementation of the present disclosure.

In this embodiment, the combustible object used in the vacuum generator is gaseous or quasi-gaseous, such as methane, or atomized gasoline. As shown in FIG. 11, the fuel replenishment unit includes an on/off valve, a fuel container, and a delivery pipe. When the on/off valve is opened, the combustible gases or oil mist are delivered from the fuel container to the cavity to be mixed with the air in the cavity. After ignition by the igniter, a flame is generated, and a vacuum pressure is formed when the flame is extinguished. The advantages of using the gaseous or quasi-gaseous fuel such as combustible gas or oil mist as the combustible object is that the flame can be formed in the whole cavity, which is helpful to improve the vacuum pressure. Experiments show that compared with the above-mentioned alcohol-containing block and asbestos block soaked with alcohol, using atomized alcohol as fuel can produce a higher vacuum pressure.

The invention claimed is:

1. A flamed-based vacuum generator, comprising a shell and a combustion assembly, wherein the shell has a cavity, the cavity being a space having at least one opening, and the combustion assembly comprises a combustible object and an igniter, the igniter being configured to ignite the combustible object, the combustible object generating a flame in the cavity, and the flame extinguishing in the cavity, wherein the vacuum generator further comprises a high pressure inhibition device configured to reduce a high pressure formed in the cavity when the flame is generated, the high pressure inhibition device in direct contact with the cavity, and wherein the high pressure inhibition device communicates the cavity and the outside atmosphere only when the pressure in the cavity is greater than a pressure outside the shell.

2. The flamed-based vacuum generator according to claim 1, wherein the combustion assembly further comprises a fuel replenishment unit, and wherein the fuel replenishment unit is configured to replenish fuel required by the combustible object to the cavity.

3. The flamed-based vacuum generator according to claim 2, wherein the fuel replenished to the cavity by the fuel replenishment unit is a combustible gas, a combustible liquid, or an atomized combustible liquid.

4. The flamed-based vacuum generator according to claim 1, wherein the vacuum generator further comprises a ventilation mechanism, and the ventilation mechanism is configured to deliver air or a combustion-supporting gas to the cavity.

5. The flamed-based vacuum generator according to claim 4, wherein the ventilation mechanism further comprises a blowing device and an intercepting mechanism, the intercepting mechanism configured to control communication between the cavity and outside atmosphere, so that the blowing device inputs the air or the combustion-supporting gas to the cavity.

* * * * *